United States Patent [19]

Shearer

[11] 4,218,999

[45] Aug. 26, 1980

[54] INLINE FUEL HEATER

[76] Inventor: Kenneth O. Shearer, P.O. Box 727, Creston, Calif. 93432

[21] Appl. No.: 831,748

[22] Filed: Sep. 9, 1977

[51] Int. Cl.² ............................................. F02M 31/00
[52] U.S. Cl. ..................................... 123/546; 165/51; 165/156
[58] Field of Search ................... 165/52, 51, 154, 156; 123/122 E, 122 H

[56] References Cited

U.S. PATENT DOCUMENTS

| | | | |
|---|---|---|---|
| 1,168,111 | 1/1916 | Pope | 123/122 E |
| 1,267,185 | 5/1918 | Coffman | 123/122 E |
| 2,060,936 | 11/1936 | Haag | 165/156 |
| 3,110,296 | 11/1963 | Lundi | 123/122 E |
| 3,253,647 | 5/1966 | Deshaies | 165/51 X |
| 3,929,187 | 12/1975 | Hurner | 165/52 |
| 3,986,486 | 10/1976 | Rabbiosi | 123/122 E |
| 4,015,567 | 4/1977 | Zeibenskie | 123/122 E |
| 4,072,138 | 2/1978 | Hawkins et al. | 123/122 E |
| 4,091,782 | 5/1978 | Dunnam | 123/122 E |

FOREIGN PATENT DOCUMENTS 52119  2/1921  Sweden ..................... 165/56

*Primary Examiner*—Samuel Scott
*Assistant Examiner*—Margaret A. Focarino
*Attorney, Agent, or Firm*—Lyon & Lyon

[57] ABSTRACT

Disclosed herein is a device for heating fuel in water cooled diesel or gasoline burning engines for preventing performance loss due to extremely cold weather conditions. The device is comprised of a jacketed flow through tube communicating with the engine such that the water heated thereby is passed directly through the tube heating the fuel which is flowing through the jacketed portion of the tube to the engine.

2 Claims, 3 Drawing Figures

INLINE FUEL HEATER

BACKGROUND OF THE INVENTION

The present invention relates to a device for heating fuel prior to combustion in diesel or gasoline burning engines which are operated in extremely cold weather conditions. In recent years, considerable construction has been undertaken in such areas, as for example, the building of the Alaskan Pipeline. When operating motor vehicles under such conditions, the fuel, whether it be diesel or gasoline, becomes extremely cold and causes severe operational difficulties such as poor combustion resulting from the drop in the cetane rating of diesel fuel or octane rating of the gasoline and an increase in emitted pollutants caused by poor ignition. In addition, cylinder wash down often occurs from the raw or unburned fuel in the cylinders washing the lubrication off the cylinder walls and causing cylinder scoring. Unburned fuel also passes into the oil pan causing crank case dilution and fuel filters tend to freeze. The result of these occurrences is poor operational performance and frequent breakdown and repairs.

Several attempts have been made to devise a method for preheating the fuel prior to combustion to reduce the effects of extreme cold weather. Such attempts, however, have heretofore proved largely unsuccessful. Examples of devices previously developed are found in U.S. Pat. Nos. 3,253,647; 3,110,296; 1,267,185 and 1,168,111. While such devices may be of some benefit in cold weather operation, they generally require difficult adjustment which cannot be readily made by the vehicle operator. In addition, such devices generally employ coils which direct the fuel in a contained helical path through a reservoir of heated water. Fuel overheating can easily result if such devices are not properly adjusted which would cause the fuel to lose its lubricating and cooling effects resulting in sticking injectors and plunger scoring. In addition, gas separation can readily occur in the coils causing formation of air pockets in the upper portions of the coil resulting in vapor lock and engine failure. It would therefore be highly desirable to develop a device for heating fuel prior to combustion for use in both diesel and gasoline operated engines in extremely cold weather conditions which obviate the need for adjusting or regulating valves while avoiding overheating of the fuel and resulting in vapor lock. Such a device is disclosed herein.

SUMMARY OF THE INVENTION

Briefly, the invention comprises a device for heating the fuel in diesel and gas burning engines prior to combustion for preventing performance loss during extreme cold weather operation. The device is comprised of a jacketed tube in fluid communication with the engine's cooling system such that heated water or engine coolant flows therethrough and in communication with the fuel system such that fuel is freely circulated about the tube in the enclosed surrounding area where it is heated prior to combustion.

It is the principal object of the present invention to provide a device for heating the fuel in diesel and gasoline burning engines prior to combustion to improve the performance thereof in severely cold weather.

It is another object of the present invention to provide a device for heating the fuel in diesel and gasoline burning engines prior to combustion which obviates the need for ongoing valve adjustment or regulation.

It is a further object of the present invention to provide a device for heating the fuel in diesel and gasoline burning engines which avoids overheating of the fuel.

It is yet another object of the present invention to provide a device for heating the fuel in diesel and gasoline burning engines which avoids vapor lock.

It is yet a further object of the present invention to provide a device for heating the fuel in diesel and gasoline burning engines which is of simple construction and economical to manufacture.

These and other objects and advantages of the present invention will become apparent from the following detailed description taken in conjunction with the accompanying drawings.

DESCRIPTION OF THE PREFERRED EMBODIMENT

IN THE DRAWINGS

Figure 1:
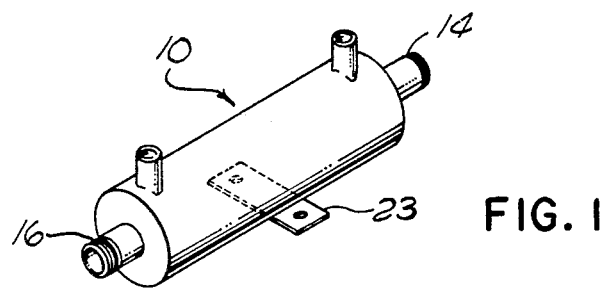
FIG. 1 is a perspective view of the fuel heater of the present invention.
Figure 2:
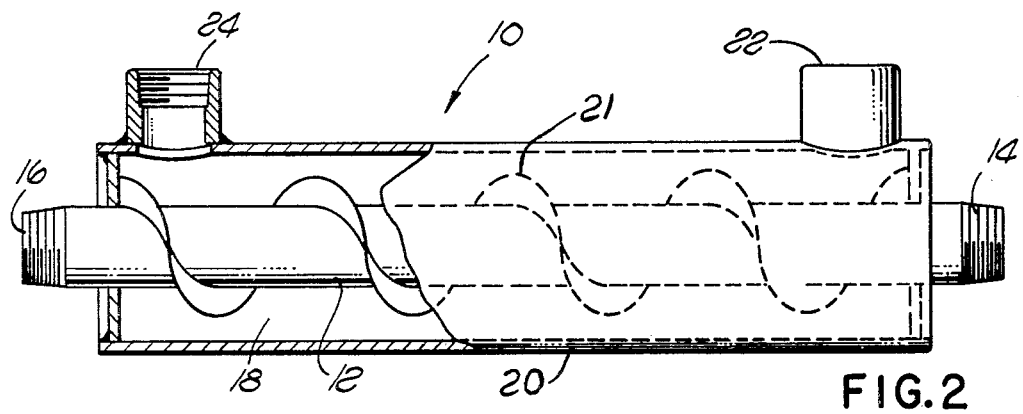
FIG. 2 is an enlarged sectional view of the fuel heater of the present invention.

Referring now in detail to the drawings, the fuel heater 10 is comprised of a heat conductive central flow through tube 12 having a fluid inlet end 14 and fluid outlet end 16 and a jacketed area 18 disposed about tube 12 which is defined by a housing 20. A flighting 21 also constructed of a heat conductive material is secured to and helically disposed about and along tube 12. The housing has a fuel inlet 22 and fuel outlet 24 therein communicating with the jacketed area 18 about tube 12. A mounting bracket 23 is affixed to the housing for securing the heater in place.

Figure 3:
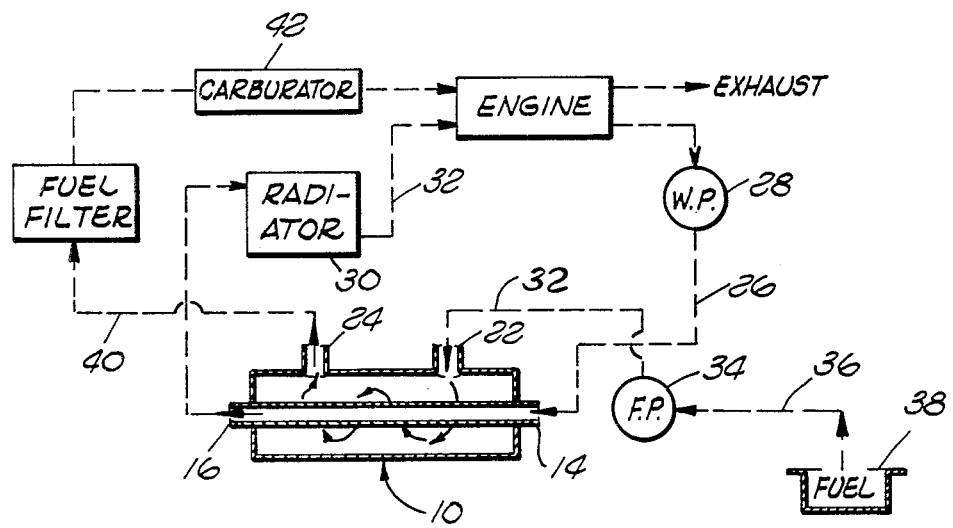
FIG. 3 is a diagram illustrating the mounting of the heater in the general assembly of a combustion engine.

A heater 10 is illustrated in FIG. 3 mounted on an engine in communication with the cooling and fuel systems. As shown therein, the fluid inlet end 14 of tube 12 communicates with a water or other coolant line 26 which in turn communicates with a water pump 28. The fluid outlet end of tube 12 communicates tube 12 with a radiator 30 and the cooling system is closed via line 32 extending between the radiator 30 and water pump 28. The fuel inlet 22 in housing 20 is coupled to a fuel line 32 extending from a fuel pump 34 which is fed via line 36 from the fuel tank 38. The fuel outlet 24 in the heater is coupled to a line 40 which directs the fuel from the heater to the injectors 42 for combustion.

In operation, the water or coolant circulating in the engine cooling system is heated and continually circulated through the central tube 12 in the heater. Concurrently, fuel is continuously pumped to the fuel inlet 22 of the heater and into the jacketed area 18 about the now heated tube 12 and flighting tube 21. As the fuel circulates about the flighting 21 and heated tube 12 within the jacketed area and passes through the outlet 24 therein to the injectors, the temperature of the fuel is elevated resulting in improved combustion and a smooth running engine.

While the fuel heater of the present invention is operable without the flighting 21, its use promotes a more even and rapid heating of the fuel while avoiding the creation of air pockets.

Various changes and modifications may be made in carrying out the present invention without departing from the spirit and scope thereof. Insofar as these changes and modifications are within the purview of the appended claims, they are to be considered as part of the present invention.

I claim:

1. A fuel heater adapted for use with a watercooled combustion engine having a flow through radiator with a water inlet and a water outlet, said heater comprising a flow through tube having an inlet end and an outlet end, said ends being adapted to be communicated with an engine cooling line communicating with the water inlet of the radiator, an elongated housing disposed about said tube inwardly of said ends to define an enclosed jacketed area about said tube, said housing having a fuel inlet means adjacent one end thereof and a fuel outlet means adjacent the other end thereof, said means being adapted to be communicated with an engine fuel line, and a flighting of heat conductive material secured to and helically disposed about and along said flow through tube within said jacketed area whereby upon operating said engine water heated by said engine is caused to pass through said tube heating the fuel passing through said jacketed area and about said tube and flighting therein.

2. The combination of claim 1 wherein said housing is of a walled cylindrical configuration, said flow through tube extending in a straight line between the ends of said housing and being sealably secured thereto and said fuel inlet and outlet means being disposed in the wall of said cylinder intermediary of the ends thereof.

* * * * *